United States Patent
Dölker

(10) Patent No.: US 12,407,283 B2
(45) Date of Patent: Sep. 2, 2025

(54) CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

(71) Applicant: Rolls-Royce Solutions GmbH, Friedrichshafen (DE)

(72) Inventor: Armin Dölker, Friedrichshafen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/537,146

(22) Filed: Dec. 12, 2023

(65) Prior Publication Data
US 2024/0113642 A1  Apr. 4, 2024

Related U.S. Application Data

(63) Continuation of application No. PCT/EP2022/066832, filed on Jun. 21, 2022.

(30) Foreign Application Priority Data

Jun. 22, 2021 (DE) .................. 10 2021 206 422.1
Jun. 21, 2022 (WO) ................ PCT/EP2022/066832

(51) Int. Cl.
*H02P 9/04* (2006.01)
*F02D 29/06* (2006.01)
*H02P 101/25* (2016.01)

(52) U.S. Cl.
CPC ............... *H02P 9/04* (2013.01); *F02D 29/06* (2013.01); *F02D 2250/24* (2013.01); *H02P 2101/25* (2015.01)

(58) Field of Classification Search
CPC ........ H02P 9/04; H02P 2101/25; F02D 29/06; F02D 2250/24
See application file for complete search history.

(56) References Cited

U.S. PATENT DOCUMENTS 7,832,510 B2  11/2010  Hoshiba et al.
9,628,010 B2  4/2017  Clarke et al.
(Continued)

FOREIGN PATENT DOCUMENTS

DE  102 48 633 A1  5/2004

OTHER PUBLICATIONS

International Search Report and Written Opinion dated Dec. 1, 2022 for International Patent Application No. PCT/EP2022/066832 (15 pages).

*Primary Examiner* — Sean Gugger
(74) *Attorney, Agent, or Firm* — TAYLOR & EDELSTEIN, PC

(57) ABSTRACT

A closed-loop control device includes: the closed-loop control device which is configured for: detecting a generator frequency ($f_G$) of the generator as a controlled variable; determining a control deviation ($e_f$) as a difference between the generator frequency ($f_G$) which is detected and a target generator frequency ($f_{soll}$); determining a target torque ($M_{soll}$) as a manipulated variable for controlling an internal combustion engine as a function of the control deviation ($e_f$); using a control rule for determining the target torque ($M_{soll}$); and adapting the control rule—which is used to determine the target torque ($M_{soll}$)—as a function of at least one adaptation variable, the at least one adaptation variable being selected from a group consisting of the generator (Continued)

frequency ($f_G$) which is detected, a target torque variable, and a generator power.

15 Claims, 9 Drawing Sheets

(56) References Cited

U.S. PATENT DOCUMENTS

| | | |
|---|---|---|
| 11,187,165 B2 | 11/2021 | Hecker et al. |
| 2014/0008988 A1* | 1/2014 | Clarke ............... H02J 3/40 |
| | | 307/85 |
| 2017/0254272 A1 | 9/2017 | Hillier |
| 2017/0254275 A1 | 9/2017 | Klotzek |
| 2021/0111652 A1 | 4/2021 | Schweitzer, III et al. |

\* cited by examiner

CLOSED-LOOP CONTROL DEVICE FOR CLOSED-LOOP CONTROL OF A POWER ASSEMBLY INCLUDING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY

CROSS REFERENCE TO RELATED APPLICATIONS

This is a continuation of PCT application no. PCT/EP2022/066832, entitled "CLOSED-LOOP CONTROL DEVICE FOR CLOSED-LOOP CONTROL OF A POWER ASSEMBLY COMPRISING AN INTERNAL COMBUSTION ENGINE AND A GENERATOR HAVING AN OPERATIVE DRIVE CONNECTION TO THE INTERNAL COMBUSTION ENGINE, CLOSED-LOOP CONTROL ARRANGEMENT HAVING SUCH A CLOSED-LOOP CONTROL DEVICE, POWER ASSEMBLY AND METHOD FOR CLOSED-LOOP CONTROL OF A POWER ASSEMBLY", filed Jun. 21, 2022, which is incorporated herein by reference. PCT application no. PCT/EP2022/066832 claims priority to German patent application no. 10 2021 206 422.1, filed Jun. 22, 2021, which is incorporated herein by reference.

BACKGROUND OF THE INVENTION

1. Field of the Invention

The present invention relates to a closed-loop control device, and, more particularly, to a closed-loop control device for closed-loop control of a power assembly.

2. Description of the Related Art

Such a closed-loop control device is typically set up to control the speed of an internal combustion engine and, indirectly, the generator frequency of a generator having an operative drive connection to the internal combustion engine. This is problematic insofar as a comparatively dynamic variable is used for the closed-loop control, wherein a gain of the controlled system is also comparatively great. As a result, the closed-loop control is intrinsically comparatively less robust, which has a particularly detrimental effect on steady-state closed-loop control behavior.

What is needed in the art is a closed-loop control device for closed-loop control of a power assembly including an internal combustion engine and a generator having an operative drive connection to the internal combustion engine, a closed-loop control arrangement including such a closed-loop control device, a power assembly including an internal combustion engine and a generator having an operative drive connection to the internal combustion engine, including a closed-loop control device of this kind or including a closed-loop control arrangement of this kind, and a method for closed-loop control of a power assembly of this kind, wherein the described disadvantages do not occur.

SUMMARY OF THE INVENTION

The present invention relates to a closed-loop control device for closed-loop control of a power assembly including an internal combustion engine and a generator having an operative drive connection to the internal combustion engine, to a closed-loop control arrangement including such a closed-loop control device, to a power assembly including an internal combustion engine and a generator having an operative drive connection to the internal combustion engine, including a closed-loop control device of this kind or including a closed-loop control arrangement of this kind, and to a method for closed-loop control of a power assembly of this kind.

The present invention provides a closed-loop control device for closed-loop control of a power assembly including an internal combustion engine and a generator having an operative drive connection to the internal combustion engine, wherein the closed-loop control device is set up to detect a generator frequency of the generator as controlled variable. The closed-loop control device is further set up to determine a control deviation as the difference between the detected generator frequency and a target generator frequency, and to determine a target torque as manipulated variable—in particular for controlling the internal combustion engine—as a function of the control deviation. The closed-loop control device is additionally set up to use a control rule to determine the target torque and to adapt the control rule used to determine the target torque as a function of at least one adaptation variable. The at least one adaptation variable is selected from a group consisting of the detected generator frequency, a target torque variable, and a generator power. Since the generator frequency is detected as controlled variable, the controlled variable is tapped at a much less dynamic, quieter point in comparison to a detection of the speed of the internal combustion engine. In addition, a detailed analysis—as presented below—shows that the gain of the controlled system in this case is significantly lower than in the case of a speed control. This makes it advantageous to use a comparatively fast frequency controller, i.e., in particular a controller with a large proportional coefficient. This in turn results in a significant improvement in the load switching behavior. Furthermore, the controlled system depends on fewer parameters, so that greater robustness is achieved, especially when using standard controller parameters. The generator generally has a much greater moment of inertia than the internal combustion engine, so that fewer torsional vibrations prevail in the region of said engine, which is ultimately the basis for the lower dynamics of the frequency as a controlled variable and thus the greater stability of the control. In particular, this also makes it possible to improve the steady-state control behavior. The fact that the target torque is determined directly as a manipulated variable for controlling the internal combustion engine as a function of the frequency control deviation also contributes to improving the dynamic control behavior.

The fact that the control rule is adapted as a function of the at least one adaptation variable makes it advantageous to ensure that the loop gain of the open control loop is as similar as possible at all operating points and optionally is constant across all operating points. This in turn simplifies the control behavior and thus, at the same time, also the adjustment of the closed-loop control device to the specific application. In particular, the closed-loop control device is easy to adapt in this way and can be used easily and reliably, which also saves costs in the application.

The use and in particular adaptation of the control rule additionally make it possible to operate the closed-loop control device in combination with a multiplicity of different power assemblies, in particular with a multiplicity of different internal combustion engines, without the need for specific adaptation to the specific power assembly being operated, in particular to the specific internal combustion engine being operated. As a result, the power assembly, in particular the internal combustion engine, can be operated virtually adjustment-free, so that the adaptation effort otherwise required with conventional closed-loop control devices and methods is advantageously minimal, optionally completely eliminated, when using the technical teaching according to the present invention or optional in accordance with the present invention.

A closed-loop control device is understood to mean, in particular, a feedback control device. Correspondingly, a closed-loop control arrangement is understood to mean, in particular, a feedback control arrangement. Accordingly, an open-loop control device is understood to mean, in particular, a non-feedback control device.

In the context of the present technical teaching, a generator frequency is understood in particular to be the frequency of the electrical voltage induced in the generator, in particular the frequency of the electrical output voltage of the generator.

In the context of the present technical teaching, a control rule is understood in particular to mean a mathematical relationship, especially an equation, which describes the behavior of a controller. In particular, the control rule describes the relationship between the manipulated variable and the control deviation. In particular, the control rule describes how the manipulated variable behaves as a function of the control deviation. In an optional embodiment, the control rule describes the behavior of a controller selected from a group consisting of a P-controller, an I-controller, a D-controller, a PI-controller, a PD-controller, a PD1-controller, a PD2-controller, a PID-controller, a PT1-controller, a PT2-controller, a PI(DT$_1$)-controller, and a combination of at least two of the aforementioned controllers. Control rules that describe the behavior of these and other controllers are generally known to a person skilled in the art.

The control rule is optionally implemented in the closed-loop control device, optionally in a hardware structure of the closed-loop control device, or in the form of software which is executed on the closed-loop control device during operation of the closed-loop control device. In particular, it is possible on the one hand for the manipulated variable to be calculated explicitly as a function of the control deviation by carrying out certain calculation steps in the software; however, it is also possible for the manipulated variable to be determined as a function of the control deviation on the basis of the specific interconnection of the hardware structure of the closed-loop control device, i.e., to be calculated indirectly, so to speak.

In the context of the present technical teaching, adaptation of the control rule as a function of at least one adaptation variable is understood in particular to mean that at least one parameter determining the control rule is changed as a function of the at least one adaptation variable. In an optional embodiment, the control rule is adapted as a function of the at least one adaptation variable by changing a proportional coefficient of the control rule as a function of the at least one adaptation variable. The control rule is determined particularly by the proportional coefficient as a parameter. Accordingly, an adaptation variable is understood to be a variable as a function of which the at least one parameter determining the control rule is changed. In particular, an adaptation variable is a variable on which a value of the at least one parameter determining the control rule depends.

In the context of the present technical teaching, a loop gain of the open control loop is understood in particular as the product of the proportional coefficient of the control rule with the static (s=0) gain of the controlled system in the event of abrupt excitation.

Optionally, the control rule is updated as a function of the at least one adaptation variable, wherein it is adapted—in particular automatically—in particular to changing operating points of the power assembly.

The target torque is used in particular for indirect control of the internal combustion engine. In an optional embodiment, an energization duration for at least one fuel injection valve, in particular an injector, of the internal combustion engine is calculated by the closed-loop control device or by an open-loop control device of the internal combustion engine which is operatively connected to the closed-loop control device as a function of the target torque, wherein the internal combustion engine is controlled with the energization duration calculated from the target torque.

In an optional embodiment, the target torque variable is the target torque itself—optionally delayed by at least one sampling step. According to another optional embodiment, the target torque variable is an integral component (I component) for the target torque, or a variable derived from the target torque or the integral component.

In an optional embodiment, the generator power is calculated—in particular from the target torque or the integral component. Alternatively, the generator power is optionally detected—in particular as a measurement variable.

A power assembly is understood here in particular to be an arrangement consisting of an internal combustion engine and an electric machine operable as a generator, i.e., a generator, wherein the internal combustion engine has an operative drive connection to the generator in order to drive the generator. Thus, the power assembly is set up in particular to convert chemical energy converted into mechanical energy in the internal combustion engine into electrical energy in the generator. The power assembly can be operated alone—in so-called island operation—or also together with a plurality of—in particular a small number of—other power assemblies in a network, i.e., in island parallel operation. However, it is also possible that the power assembly is operated on a, in particular, larger power grid or energy supply grid, in particular a supra-regional power grid, in grid parallel operation.

For the purpose of the following derivation, a stationary state is considered, and therefore the variables concerned are given with the index "stat". However, the relationships, correlations and equations derived in this way are also valid in transient states.

If the controlled system of the power assembly is modeled as a dual-mass oscillator, the following transfer function results in the case of frequency control:

$$G_s^f(s) = \frac{f_G(s)}{M_{soll}(s)} = \frac{f_{G,stat}}{30 M_{m,stat}} \cdot \frac{1 + \frac{\Psi}{2\pi\Omega}s}{1 + \left\{\frac{\theta_m + \theta_L}{l_{stat}} + \frac{\Psi}{2\pi\Omega}\right\}s + \left\{\frac{\Psi\Omega\theta_m\theta_L}{2\pi l_{stat}c} + \frac{\theta_m}{c}\right\}s^2 + \frac{\theta_m\theta_L}{l_{stat}c}s^3} \tag{1}$$

with the detected generator frequency $f_G$, the target torque $f_G$ of the internal combustion engine, the torque $M_{m,stat}$ of the internal combustion engine, the generator frequency $f_{G,stat}$, and a term which is dependent on the complex variable s and the quantities of which are named below.

If the frequency controller contains a P-controller, i.e., if a PI-controller, a PID-controller or a PI(DT₁)-controller is used as the frequency controller, for example, the following applies to the—in particular constant—predefinable loop gain $v^f$ of the open control loop:

$$v^f = k_p^f \frac{f_{G,stat}}{30 M_{m,stat}}, \qquad (2)$$

and solved according to the proportional coefficient $k_p^f$ of the frequency controller:

$$k_p^f = \frac{30 \, v^f M_{m,stat}}{f_{G,stat}}. \qquad (3)$$

Equation (3) shows that it is advantageously possible to keep the, optionally constant, circuit gain constant at all operating points of the power assembly by changing, in particular updating, the proportional coefficient in a suitable manner. A relationship such as equation (3) is sometimes also referred to as a control rule for short.

When modeling the controlled system as a dual-mass oscillator, the following results for the speed control of the internal combustion engine:

$$G_s^{n,m}(s) = \frac{n_m(s)}{M_{Soll}(s)} = \frac{n_{m,stat}}{M_{m,stat}} \frac{1 + s\left\{\frac{\Psi}{2\pi\Omega} + \frac{l_{stat}}{c}\right\} + \frac{\theta_L}{c}s^2}{1 + \left\{\frac{\theta_m + \theta_L}{l_{stat}} + \frac{\Psi}{2\pi\Omega}\right\}s + \left\{\frac{\Psi\Omega\theta_m\theta_L}{2\pi l_{stat}c} + \frac{\theta_m}{c}\right\}s^2 + \frac{\theta_m\theta_L}{l_{stat}c}s^3}, \qquad (4)$$

with the detected speed $n_m$ of the internal combustion engine, the target torque $M_{soll}$ of the internal combustion engine, the generator torque $M_{m,stat}$ of the internal combustion engine, the speed $n_{m,stat}$, and a term which is dependent on the complex variable s and the quantities of which are named below.

Since the generator frequency and the speed of the internal combustion engine are proportional to each other, it is possible to compare the transfer function $G_s^f(s)$ for frequency control according to equation (1) directly with the transfer function $G_s^{n,m}(s)$ for speed control according to equation (4). This shows that the gain of the controlled system in the case of frequency control is smaller by a factor of 30 compared to the gain of the controlled system in the case of speed control. This allows the proportional coefficient $k_p^f$ for the frequency controller with identical loop gain of the open control loop to be selected greater by a factor of 30 than in the case of speed control. As a result, a significantly better dynamic behavior of the power assembly can be expected for frequency control than in the case of speed control. In particular, it is advantageous to use a faster controller in the case of frequency control.

A further advantage is evident from a comparison of the numerator polynomials of the transfer functions $G_s^f(s)$ for frequency control according to equation (1) and $G_s^{n,m}(s)$ for speed control according to equation (4): while the numerator polynomial according to equation (4) depends on a larger number of variables, the coefficients of the numerator polynomial according to equation (1) depend only on the dimensionless damping $\Psi$ and the angular frequency $\Omega$. This results in a more robust control of the generator frequency compared to control of the speed of the internal combustion engine, as the controlled system in the case of frequency control depends on substantially fewer variables and therefore fewer external influences. Furthermore, the generator runs comparatively more smoothly than the internal combustion engine due to its significantly heavier mass, which also results in a lower gain of the controlled system.

The transfer function according to equation (1) can be derived from the model of the controlled system as a dual-mass oscillator, in particular in the following way:

within the framework of the dual-mass oscillator model, it is assumed that the internal combustion engine, with its moment of inertia $\theta_m$, is connected to the generator, which has the moment of inertia $\theta_L$, via a shaft, wherein this torque-transmitting connection is described by a spring stiffness c and a damping b (b describes here the dimensional damping, which is later converted into the dimensionless damping $\Psi$). With the angle of rotation $\rho_m$ of the internal combustion engine, the angle of rotation $\rho_L$ of the generator, the torque $M_m$ applied by the internal combustion engine, the load torque $M_L$ acting on the generator and the known notation with superimposed points for the time derivative, the following equations then result for the torque balance:

$$\theta_m \ddot{\rho}_m = M_m - c(\rho_m - \rho_L) - b(\dot{\rho}_m - \dot{\rho}_L), \text{ and} \qquad (5)$$

$$\theta_L \ddot{\rho}_L = -M_L - c(\rho_L - \rho_m) - b(\dot{\rho}_L - \dot{\rho}_m), \qquad (6)$$

with $$M_L = k_G \frac{\dot{\rho}_L}{2\pi}, \qquad (7)$$

wherein $$k_G = \pi l^2 B^2 A^2 \frac{\cos \varphi}{|X_L|}, \qquad (8)$$

with the number l and the area A of the conductor loops of the generator, the magnetic flux density B, and the impedance $X_L$ of the load electrically connected to the generator, wherein equation (8) is easily derived from a consideration of the electrodynamic load behavior of the generator, the following results after linearization in a steady-state operating state after some transformations:

$$\Delta\ddot{\rho}_m - \Delta\ddot{\rho}_L = -c(\Delta\rho_m - \Delta\rho_L)\left\{\frac{1}{\theta_m} + \frac{1}{\theta_L}\right\} - b(\Delta\dot{\rho}_m - \Delta\dot{\rho}_L)\left\{\frac{1}{\theta_m} + \frac{1}{\theta_L}\right\} + \frac{\Delta M_m}{\theta_m} + \frac{1}{2\pi\theta_L}k_G\Delta\dot{\rho}_L. \qquad (9)$$

The variables preceded by $\Delta$ are the deflections from the stationary operating point used in linearization, with $$\Omega := \sqrt{c\left\{\frac{1}{\theta_m} + \frac{1}{\theta_L}\right\}}, \qquad (10)$$

and

-continued $$\Psi := \frac{2\pi\Omega b}{c}, \quad (11)$$

whereby at the same time the dimensionless damping $\Psi$ is introduced, the following is given:

$$\Delta\ddot{\rho}_m - \Delta\ddot{\rho}_L = -\Omega^2(\Delta\rho_m - \Delta\rho_L) - \frac{\Psi\Omega}{2\pi}(\Delta\dot{\rho}_m - \Delta\dot{\rho}_L) + \frac{\Delta M_m}{\theta_m} + \frac{1}{2\pi\theta_L}k_G\Delta\dot{\rho}_L, \quad (12)$$

and $$\Delta\ddot{\rho}_L = \frac{1}{\theta_L}\left\{c(\Delta\rho_m - \Delta\rho_L) + \frac{c\Psi}{2\pi\Omega}(\Delta\dot{\rho}_m - \Delta\dot{\rho}_L) - \frac{1}{2\pi}k_G\Delta\dot{\rho}_L\right\}. \quad (13)$$

If the three variables $x_1$, $x_2$ and $x_3$ as follows are now introduced:

$$x_1 := \Delta\rho_m - \Delta\rho_L, \quad (14)$$

$$x_2 := \Delta\dot{\rho}_m - \Delta\dot{\rho}_L, \text{ and} \quad (15)$$

$$x_3 := \Delta\dot{\rho}_L, \quad (16)$$

this gives:

$$\begin{bmatrix} \dot{x}_1 \\ \dot{x}_2 \\ \dot{x}_3 \end{bmatrix} = \begin{bmatrix} 0 & 1 & 0 \\ -\Omega^2 & -\frac{\Psi\Omega}{2\pi} & \frac{k_G}{2\pi\theta_L} \\ \frac{c}{\theta_L} & \frac{c\Psi}{2\pi\theta_L\Omega} & -\frac{k_G}{2\pi\theta_L} \end{bmatrix} \begin{bmatrix} x_1 \\ x_2 \\ x_3 \end{bmatrix} + \begin{bmatrix} 0 \\ \frac{1}{\theta_m} \\ 0 \end{bmatrix} \Delta M_m, \quad (17)$$

with $$\underline{x} := \begin{bmatrix} x_1 \\ x_2 \\ x_3 \end{bmatrix}, \quad (18)$$

$$A := \begin{bmatrix} 0 & 1 & 0 \\ -\Omega^2 & -\frac{\Psi\Omega}{2\pi} & \frac{k_G}{2\pi\theta_L} \\ \frac{c}{\theta_L} & \frac{c\Psi}{2\pi\theta_L\Omega} & -\frac{k_G}{2\pi\theta_L} \end{bmatrix}, \quad (19)$$

and $$\underline{b} := \begin{bmatrix} 0 \\ \frac{1}{\theta_m} \\ 0 \end{bmatrix} \quad (20)$$

equation (17) corresponds as follows:

$$\underline{\dot{x}} = A\underline{x} + \underline{b}\Delta M_m. \quad (21)$$

After Laplace transformation and transition to the transfer function, the following is obtained:

$$G(s) = \frac{\underline{c}^T P(s)\underline{b}}{\|sI - A\|}, \quad (22)$$

with the adjugates $P(s)$ of the matrix $(sI-A)$ and the unit matrix $I$.

Since the speed deflection $\Delta n_L$ of the generator at the steady-state operating point is given by $$\Delta n_L = \frac{1}{2\pi}x_3, \quad (23)$$

the following is used to derive the transfer function for the frequency control:

$$y := \begin{bmatrix} 0 & 0 & \frac{1}{2\pi} \end{bmatrix} \underline{x}, \quad (24)$$

and $$\underline{c}^T := \begin{bmatrix} 0 & 0 & \frac{1}{2\pi} \end{bmatrix}. \quad (25)$$

With the definitions $$P_{stat} := 2\pi k_G n_{L,stat}^2, \quad (26)$$

wherein $n_{L,stat}$ is the speed of the generator at the steady-state operating point, and, after switching to dimensionless representation—with the speed specified in 1/min, the frequency in Hz and the power in kW, $$l_{stat} := \frac{9 \cdot 10^5 P_{stat}}{\pi^2 n_{L,stat}^2} \quad (27)$$

what is obtained, taking into account $$f_G = \frac{n_L}{30}, \quad (28)$$

due to 1500 min$^{-1}$ $\triangleq$ 50 Hz as the relationship between the speed of the internal combustion engine and the generator frequency—ultimately from equation (22) is the transfer function according to equation (1).

The transfer function for speed control is derived similarly. Because of equations (15) and (16), the deflection of the speed of the internal combustion engine in the steady state is $$\Delta n_m = \frac{\Delta\dot{\rho}_m}{2\pi} = \frac{1}{2\pi}(x_2 + x_3), \quad (29)$$

and correspondingly in dimensionless representation, with specification of the speed in 1/min $$\Delta n_m = \frac{30}{\pi}(x_2 + x_3). \quad (30)$$

Therefore, the solution of equation (22) is now applied:

$$\underline{c}^T := \begin{bmatrix} 0 & \frac{30}{\pi} & \frac{30}{\pi} \end{bmatrix}. \quad (31)$$

Thus, with the definitions according to equations (26) and (27) and also $$n_{m,stat} = n_{L,stat} \quad (32)$$

the transfer function of the controlled system for speed control according to equation (4) then readily follows analogously to the derivation of equation (1).

Optionally, the closed-loop control device is set up to limit the detected generator frequency downward, in particular to a predetermined frequency limit value.

Alternatively or additionally, the closed-loop control device is optionally set up to limit the target torque variable downward, in particular to a predetermined torque limit value.

Alternatively or additionally, the closed-loop control device is optionally set up to limit the generator power downward, in particular to a predetermined power limit value.

According to a development of the present invention, it is provided that the closed-loop control device is set up to adapt the control rule by determining the proportional coefficient of the control rule in such a way that the predetermined loop gain of the open control loop is constant, optionally remains constant—in particular over all operating points of the power assembly. Particularly especially in this way, the closed-loop control device can be easily adapted and can be used easily and reliably. In particular, equation (3) shows that it is possible to always adjust the proportional coefficient $k_p^f$ in such a way that the loop gain $v^f$ is constant—in particular irrespective of the current operating point of the power assembly.

The predetermined loop gain $v^f$ is optionally parameterizable, i.e., in particular can be set or preset by a user. In this way, a user of the closed-loop control device or a user of a power assembly that is operated with the closed-loop control device can set the loop gain $v^f$ in the desired manner. The proportional coefficient $k_p^f$ is then suitably adapted to the loop gain of selected by the user. This has the advantage in particular that no complex adjustment of the closed-loop control device to the power assembly is required.

In particular, the closed-loop control device is set up to select the proportional coefficient $k_p^f$ so as to be proportional to the predetermined loop gain $v^f$. The dependence of the proportional coefficient $k_p^f$ on the predetermined loop gain $v^f$ is not explicitly considered further in the following, however, as the predetermined loop gain $v^f$ is optionally set once or at most rarely by a user and is otherwise kept constant. It can therefore be regarded as a constant for practical applications.

According to a development of the present invention, it is provided that the closed-loop control device is set up to determine the proportional coefficient as a function of the detected generator frequency and the target torque variable. In particular, the closed-loop control device is optionally set up to determine the proportional coefficient $k_p^f$ according to equation (3). In this way, the proportional coefficient $k_p^f$ can be updated flexibly and precisely.

The proportional coefficient $k_p^f$ is optionally determined in particular proportionally to the target torque variable. Alternatively or additionally, the proportional coefficient $k_p^f$ is determined inversely proportionally to the detected generator frequency.

According to a development of the present invention, it is provided that the closed-loop control device is set up to determine the proportional coefficient only as a function of the target torque variable, in particular proportionally to the target torque variable. The closed-loop control device is also set up to set the generator frequency as constant for the purpose of determining the proportional coefficient. This is a particularly simple and at the same time robust way of determining the proportional coefficient and thus adapting the control rule. The corresponding simplification is possible in particular because the generator frequency typically varies only slightly during generator operation, so that there is no need to fear any major mismatch if the generator frequency is assumed to be constant. In particular, the proportional coefficient in this case depends only on the target torque variable, in particular according to equation (3) on the target torque of the internal combustion engine in the steady state. This target torque is calculated by the closed-loop control device itself, which in turn means that the proportional coefficient, particularly optionally, does not then depend on a sensor signal. A further advantage of this is that no measures need to be taken for a possible sensor failure when calculating the proportional coefficient. The calculation of the proportional coefficient is therefore advantageously as robust as possible.

In an optional embodiment, a predetermined standard frequency value is set as constant generator frequency. This can, for example, be 50 Hz or 60 Hz—depending in particular on the field of application of the power assembly.

According to a development of the present invention, it is provided that the closed-loop control device is set up to determine the proportional coefficient as a function of a detected generator power of the generator. In this way, a robust determination of the proportional coefficient and thus adaptation of the control rule is possible. Optionally, the proportional coefficient $k_p^f$ is optionally determined proportionally to the detected generator power.

In an optional embodiment, the detected generator power can be measured directly—in particular electrically at the generator—or obtained as filtered generator power by way of a filter, in particular a $PT_1$ filter or mean value filter, from the measured generator power.

Alternatively or additionally, according to another optional embodiment, it is possible for the detected generator power to be calculated from the detected generator frequency on the one hand, be it directly the measured generator frequency or the filtered generator frequency, and the instantaneous torque or the target torque of the internal combustion engine on the other hand.

According to an optional embodiment, however, the detected generator power can also be calculated only as a function of the instantaneous torque or the target torque of the internal combustion engine, wherein the generator frequency is set to be constant at least for the purpose of calculating the generator power.

According to a further optional embodiment, the closed-loop control device is set up to determine the proportional coefficient $k_p^f$ as a function of the detected generator power and additionally of the detected generator frequency, in particular inversely proportionally to a square of the detected generator frequency.

According to another alternative optional embodiment, the closed-loop control device is set up to determine the proportional coefficient $k_p^f$ as a function of the detected generator power, and to set the generator frequency as constant for the purpose of determining the proportional coefficient $k_p^f$. In this case, too, the detected generator power is optionally measured or obtained as filtered generator power, or it is calculated only as a function of the instantaneous torque or the target torque of the internal combustion engine using the generator frequency set to be constant. In an optional embodiment, a predetermined standard frequency value is set as constant generator frequency. This can, for example, be 50 Hz or 60 Hz—depending in particular on the field of application of the power assembly.

According to a development of the present invention, it is provided that the closed-loop control device is set up to filter an instantaneous actual frequency of the generator and to use the filtered actual frequency as the detected generator frequency. This advantageously enables particularly quiet and therefore robust control. The instantaneous actual frequency is optionally measured directly at the generator. According to an optional embodiment, the instantaneous actual frequency is filtered using a $PT_1$ filter or mean value filter, wherein the detected generator frequency results from the $PT_1$ filter or mean value filter.

According to a development of the present invention, it is provided that the closed-loop control device is designed as an open-loop control device for direct control of the internal combustion engine. This represents a particularly simple and cost-effective design of the closed-loop control device, wherein in particular no additional open-loop control device beyond the already existing open-loop control device is required. In an optional embodiment, the functionality of the closed-loop control device is implemented in the open-loop control device of the internal combustion engine in the form of a computer program product. This makes it particularly easy to retrofit an existing open-loop control device with the functionality according to the technical teaching presented here.

The open-loop control device is optionally an engine controller of the internal combustion engine. The open-loop control device is particularly optionally a so-called engine control unit (ECU). The engine controller or the ECU is optionally set up to calculate at least one energization duration for at least one fuel injection valve, in particular an injector, of the internal combustion engine on the basis of the target torque.

If the closed-loop control device is designed as an open-loop control device, in particular an engine controller, and is set up for direct control of the internal combustion engine, it is possible that a speed control of the open-loop control device is active and is used in particular to calculate the energization duration for the at least one fuel injection valve, in particular the injector, which is provided for injecting fuel into the at least one combustion chamber of the internal combustion engine, depending on the calculated target torque. However, it is also possible for the energization duration to be calculated from the target torque bypassing a speed controller or without using a speed controller.

Alternatively, it is optional for the closed-loop control device to be designed as a generator controller—in particular a higher-level generator controller. In this case, the closed-loop control device optionally has an interface to an open-loop control device of the internal combustion engine. This represents a particularly flexible design of the closed-loop control device. In particular, the closed-loop control device can easily be used with a multiplicity of different existing power assemblies, especially by being connected upstream of an open-loop control device provided there and connected thereto via the interface. The closed-loop control device is optionally set up to transmit the target torque to the open-loop control device via the interface. The open-loop control device is optionally set up to calculate at least one energization duration for at least one fuel injection valve on the basis of the target torque.

In particular, a generator controller is understood to mean an open-loop control unit separate, i.e., in particular external, from the open-loop control device of the internal combustion engine, which unit is set up to control the generator frequency of the generator by specifying the target torque for the internal combustion engine, in particular to transmit the target torque as a manipulated variable to the open-loop control device of the internal combustion engine. In particular, a generator controller itself is not an open-loop control unit for the internal combustion engine, especially not a so-called engine control unit (ECU). In particular, the generator controller is provided in addition to the open-loop control device for the internal combustion engine, i.e., in addition to the open-loop control unit. The fact that the generator controller is optionally higher-level means that it is optionally connected upstream of the open-loop control device.

If the closed-loop control device designed as a—in particular higher-level—generator controller is used in combination with an open-loop control device of the internal combustion engine, the open-loop control device is optionally operated with deactivated speed control or without speed control. In an optional embodiment, however, a final idling speed controller is activated in the open-loop control device. When the final idling speed controller is active, the speed of the internal combustion engine is subject to closed-loop control when the engine speed falls below a lower limit speed or exceeds an upper limit speed. Between the lower limit speed and the upper limit speed, the target torque used in the open-loop control device corresponds to the target torque specified by the generator controller and transmitted via the interface. In particular, a torque specification of the open-loop control device is activated in this configuration.

A suitable final idling speed controller is disclosed in particular in DE 102 48 633 B4.

According to a development of the present invention, it is provided that the closed-loop control device does not have a subordinate speed control.

In particular, the closed-loop control device optionally does not have a speed specification for the internal combustion engine. In particular, the closed-loop control device optionally does not generate a speed specification for the internal combustion engine. This represents a particularly simple and functional design, wherein in particular only a torque specification for the internal combustion engine is generated by the closed-loop control device, which enables very robust control.

The present invention also provides a closed-loop control arrangement for closed-loop control of a power assembly, including an internal combustion engine and a generator having an operative drive connection to the internal combustion engine. The closed-loop control arrangement includes a closed-loop control device according to the present invention or a closed-loop control device according to one or more of the previously described exemplary embodiments, which is designed as a—in particular higher-level—generator controller. The closed-loop control arrangement additionally has an open-loop control device which is operatively connected to the closed-loop control device and which is set up for directly controlling the internal combustion engine. The closed-loop control device is set up to transmit the target torque, generated as manipulated variable, to the open-loop control device. The open-loop control device optionally does not have a speed controller. Alternatively, a speed controller implemented in the open-loop control device is optionally deactivated. Alternatively, a final idling speed controller is optionally activated in the open-loop control device. In particular, the advantages which have already been explained previously in conjunction with the closed-loop control device are provided in conjunction with the closed-loop control arrangement.

In particular, the open-loop control device optionally has only one final idling speed controller, or only one final idling speed controller is active. A suitable final idling speed controller is disclosed in particular in DE 102 48 633 B4. In particular, the advantages which have already been disclosed previously in conjunction with the final idling speed controller are provided.

The present invention also provides a power assembly which has an internal combustion engine and a generator having an operative drive connection to the internal combustion engine. In addition, the power assembly has a closed-loop control device according to the present invention or a closed-loop control device according to one or more of the previously described exemplary embodiments. Alternatively, the power assembly has a closed-loop control arrangement according to the present invention or a closed-loop control arrangement according to one of the previously described exemplary embodiments. The closed-loop control device or the closed-loop control arrangement is operatively connected to the internal combustion engine and the generator of the power assembly. In particular, the advantages which have already been explained previously in conjunction with the closed-loop control device and/or the closed-loop control arrangement are provided in conjunction with the power assembly.

Lastly, the present invention also provides a method for closed-loop control of a power assembly including an internal combustion engine and a generator having an operative drive connection to the internal combustion engine, wherein the method includes the following steps: a generator frequency of the generator is detected as a controlled variable; a control deviation is determined as the difference between the detected generator frequency and a target generator frequency; a target torque is determined as a manipulated variable—in particular for controlling the internal combustion engine—as a function of the control deviation; a control rule is used to determine the target torque; the control rule used to determine the target torque, in particular implemented in the closed-loop control device, is adapted, in particular updated, as a function of at least one adaptation variable, wherein the at least one adaptation variable is selected from a group consisting of the detected generator frequency, a target torque variable, and a generator power. In particular, the advantages which have already been explained previously in conjunction with the closed-loop control device, the closed-loop control arrangement and the power assembly are provided in conjunction with the method.

In an optional embodiment, the target torque itself—optionally delayed by at least one sampling step—is used as the target torque variable. According to another optional embodiment, an integral component (I component) for the target torque, or a variable derived from the target torque or the integral component, is used as the target torque variable.

In an optional embodiment, the generator power is calculated as a target torque variable—in particular from the target torque or the integral component. Alternatively, the generator power is optionally detected—in particular as a measurement variable.

Optionally, the control rule is adapted by determining a proportional coefficient of the control rule in such a way that a predetermined loop gain of the open control loop is constant, in particular remains constant.

Optionally, the proportional coefficient is calculated as a function of the detected generator frequency and the target torque variable.

Optionally, the proportional coefficient is determined only as a function of the target torque variable, and the generator frequency is set as constant for the purpose of determining the proportional coefficient.

Optionally, the proportional coefficient is determined as a function of a detected generator power of the generator, optionally additionally as a function of the detected generator frequency, or by setting the generator frequency as constant for the purpose of determining the proportional coefficient.

Optionally, the detected generator power is measured directly—in particular electrically at the generator—or obtained as filtered generator power by way of a filter, in particular a $PT_1$ filter or mean value filter, from the measured generator power.

Alternatively or additionally the detected generator power is optionally calculated from the detected generator frequency on the one hand, be it directly the measured generator frequency or the filtered generator frequency, and the instantaneous torque or the target torque of the internal combustion engine on the other hand. According to an optional embodiment, however, the detected generator power can also be calculated only as a function of the instantaneous torque or the target torque of the internal combustion engine, wherein the generator frequency is set to be constant at least for the purpose of calculating the generator power.

Optionally, an instantaneous actual frequency of the generator is filtered and the filtered actual frequency is used as the detected generator frequency.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
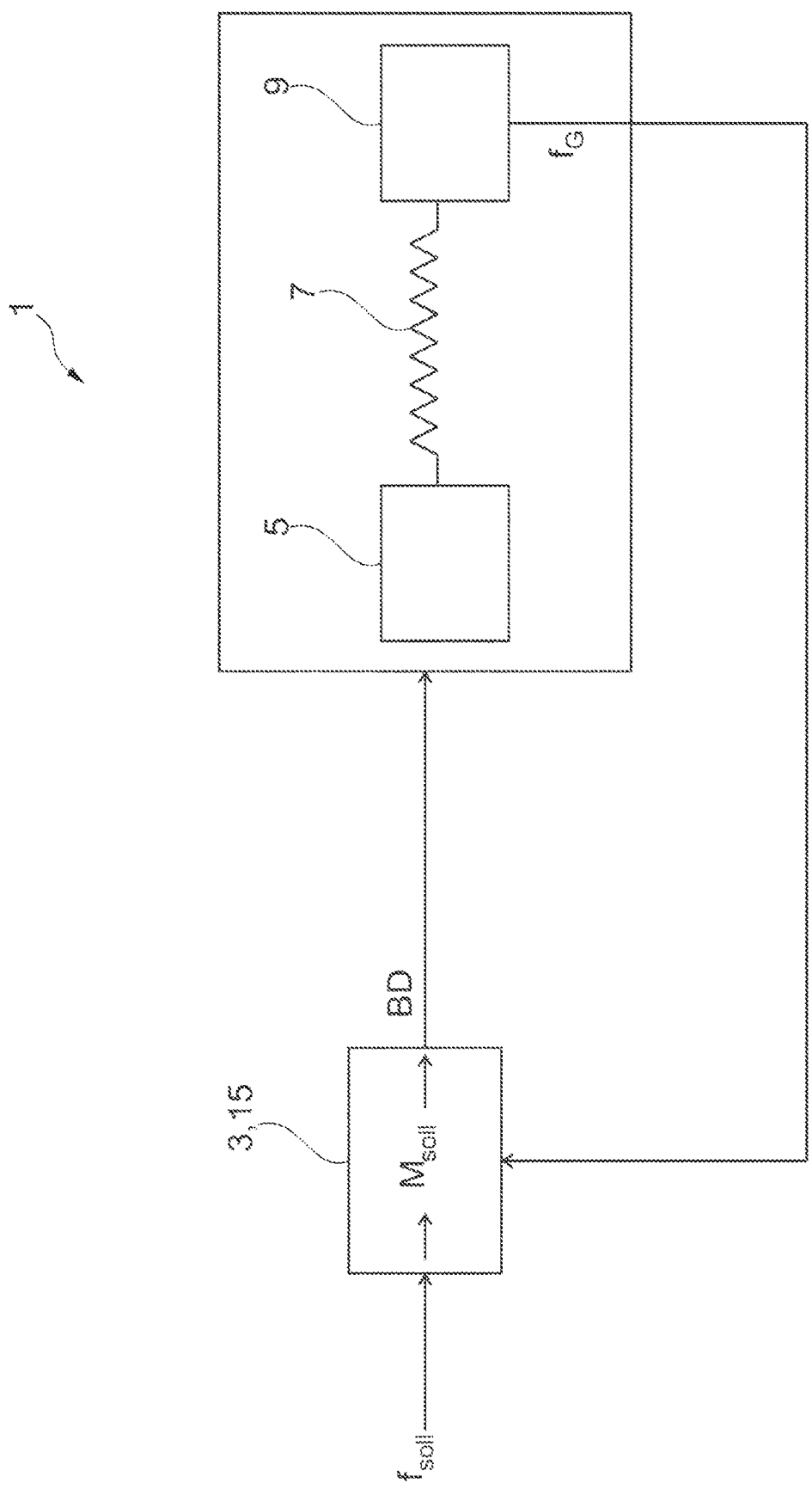
FIG. 1 shows a schematic representation of a first exemplary embodiment of a power assembly with a first exemplary embodiment of a closed-loop control device.

FIG. 1 shows a schematic representation of a first exemplary embodiment of a power assembly 1 with a first exemplary embodiment of a closed-loop control device 3. The power assembly 1 has an internal combustion engine 5 and a generator 9 which has an operative drive connection to the internal combustion engine 5 via a shaft 7. The closed-loop control device 3 is operatively connected to the internal combustion engine 5 on the one hand and to the generator 9 on the other.

In particular, the closed-loop control device 3 is set up for closed-loop control of the power assembly 1, wherein it is set up to detect a generator frequency $f_G$ of the generator 9 as a controlled variable, to determine a control deviation as the difference between the detected generator frequency $f_G$ and the target generator frequency $f_{soll}$, and to determine a target torque $M_{soll}$ as a manipulated variable for controlling the internal combustion engine 5 as a function of the control deviation, and to adapt a control rule, used for determining the target torque $M_{soll}$, as a function of at least one adaptation variable. The adaptation variable is selected here from a group consisting of the detected generator frequency $f_G$, a target torque variable, and a generator power of the generator 9.

In the first exemplary embodiment shown here, the closed-loop control device 3 is designed as an open-loop control device 15, in particular an engine controller, for direct, in particular immediate control of the internal combustion engine 5.

In addition to the generator frequency, the closed-loop control device 3 optionally has other input variables that are not explicitly shown here: a target generator frequency, a target power for the generator 9, a measured generator power of the generator 9, and optionally other variables.

In particular, the closed-loop control device 3 is set up to calculate an energization duration BD for controlling the injectors of the internal combustion engine 5 from the control deviation and the target torque $M_{soll}$ determined therefrom. In this arrangement, the generator frequency $f_G$ is the controlled variable, and the target torque $M_{soll}$ calculated in the open-loop control device 15 is the manipulated variable of the frequency control loop.

Figure 2:
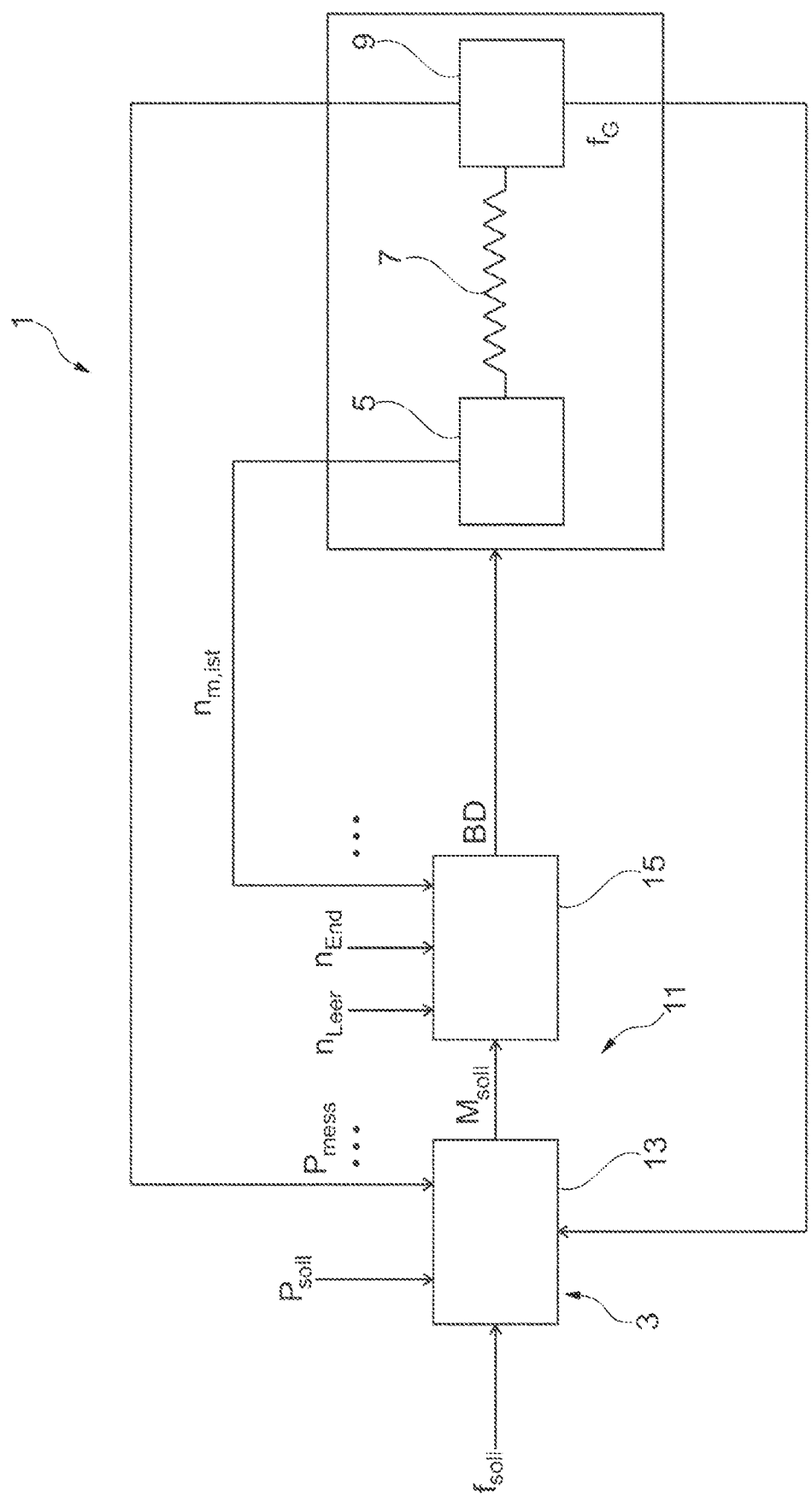
FIG. 2 shows a schematic representation of a second exemplary embodiment of a power assembly with a first exemplary embodiment of a closed-loop control arrangement and a second exemplary embodiment of a closed-loop control device.

FIG. 2 shows a schematic representation of a second exemplary embodiment of a power assembly 1 with a first exemplary embodiment of a closed-loop control arrangement 11 and a second exemplary embodiment of a closed-loop control device 3.

Like and functionally similar elements are provided with the same reference signs in all figures, and therefore reference is made to the previous description in each case.

In the second exemplary embodiment, the closed-loop control device 3 is designed as a higher-level generator controller 13. In particular, the generator controller 13 has an interface to an open-loop control device 15 of the internal combustion engine 5.

In addition to the generator frequency, the generator controller 13 also has other input variables: the target generator frequency $f_{soll}$, a target power $P_{soll}$ for the generator 9, a measured generator power $P_{mess}$ of the generator 9, and optionally other variables not explicitly shown here. The generator controller 13 again uses the target generator frequency $f_{soll}$ and the detected generator frequency $f_G$ to calculate the target torque $M_{soll}$, which represents the manipulated variable of the frequency control loop and is transmitted to the open-loop control device 15. The open-loop control device 15 in turn uses the target torque $M_{soll}$ to calculate the energization duration BD as a control signal for the injectors of the internal combustion engine 5.

A speed controller of the open-loop control device 15 is optionally deactivated here. Optionally, a final idling speed controller of the open-loop control device 15 is activated. This controls the engine speed if a lower speed limit $n_{Leer}$ is undershot or an upper speed limit $n_{End}$ is exceeded by an instantaneous speed $n_{m,ist}$ of the internal combustion engine 5. Between these speed limits, a target torque calculated in the open-loop control device 15 is equal to the target torque $M_{soll}$ specified by the generator controller 13. In particular, a torque specification is activated in the open-loop control device 15.

Optionally, the closed-loop control device 3 has no subordinate speed control, in particular no speed specification for the internal combustion engine 5. In particular, the closed-loop control device 3 does not generate any subordinate speed control, in particular no speed specification for the internal combustion engine 5.

Figure 3:
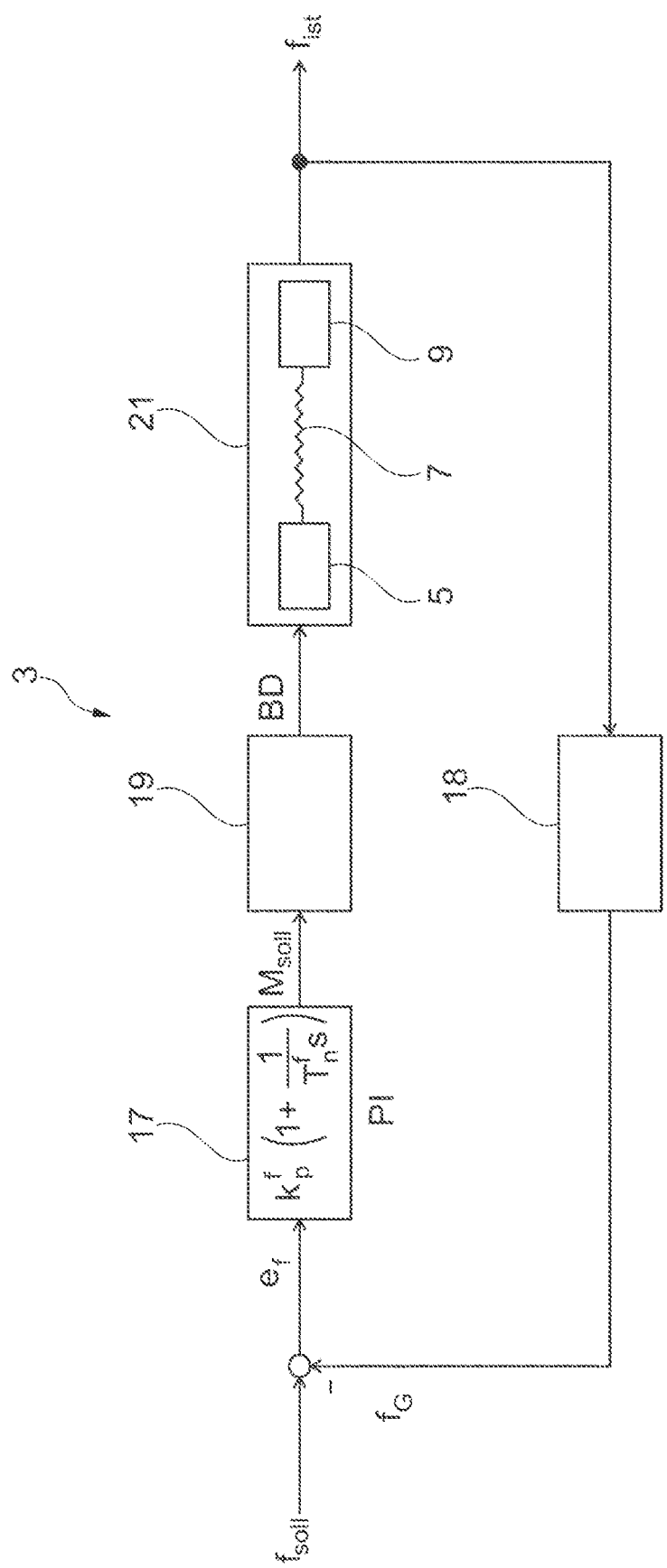
FIG. 3 shows a detailed representation of a control loop for frequency control with a frequency controller.

FIG. 3 shows a detailed representation of a control loop for frequency control with the closed-loop control device 3 as frequency controller 17. This representation is independent of whether the closed-loop control device 3 is designed as an open-loop control device 15, in particular an engine controller, or as a higher-level generator controller 13. In particular, the frequency controller 17 shown can be implemented in the open-loop control device 15 or in the generator controller 13. Accordingly, a conversion element 19, which is also shown, is either implemented in the open-loop control device 15 together with the frequency controller 17, or it is implemented in the open-loop control device 15 on its own if the frequency controller 17 is implemented in the generator controller 13.

The internal combustion engine 5 and the generator 9 are shown here together as controlled system 21.

FIG. 3 shows in particular the closed frequency control loop. The frequency controller 17 has the control deviation $e_f$ resulting from the difference between the detected generator frequency $f_G$ and the target generator frequency $f_{soll}$ as an input variable, and the target torque $M_{soll}$ as an output variable. The frequency controller 17 is optionally—as shown in FIG. 3—implemented as a PI algorithm; however, it can also be implemented in another optional embodiment as a PI(DT$_1$) algorithm. The transfer function of the PI frequency controller is as follows:

$$G_r^f(s) = k_p^f\left(1 + \frac{1}{T_n^f s}\right) = \frac{M_{soll}(s)}{e_f(s)}, \tag{33}$$

with the proportional coefficient $k_p^f$ and the reset time $T_n^f$.

In the exemplary embodiment shown here, an instantaneous actual frequency $f_{ist}$ of the generator 9 is filtered in a first filter 18, and the filtered actual frequency $f_{ist}$ is used as detected generator frequency $f_G$. However, an embodiment is also possible in which the instantaneous actual frequency $f_{ist}$ of the generator 9 is used directly as detected generator frequency $f_G$.

The target torque $M_{soll}$ resulting as the output variable of the frequency controller 17 is fed to the conversion element 19 as an input variable. The conversion element 19 uses this to calculate the energization duration BD for the injectors of the internal combustion engine 5.

Figure 4:
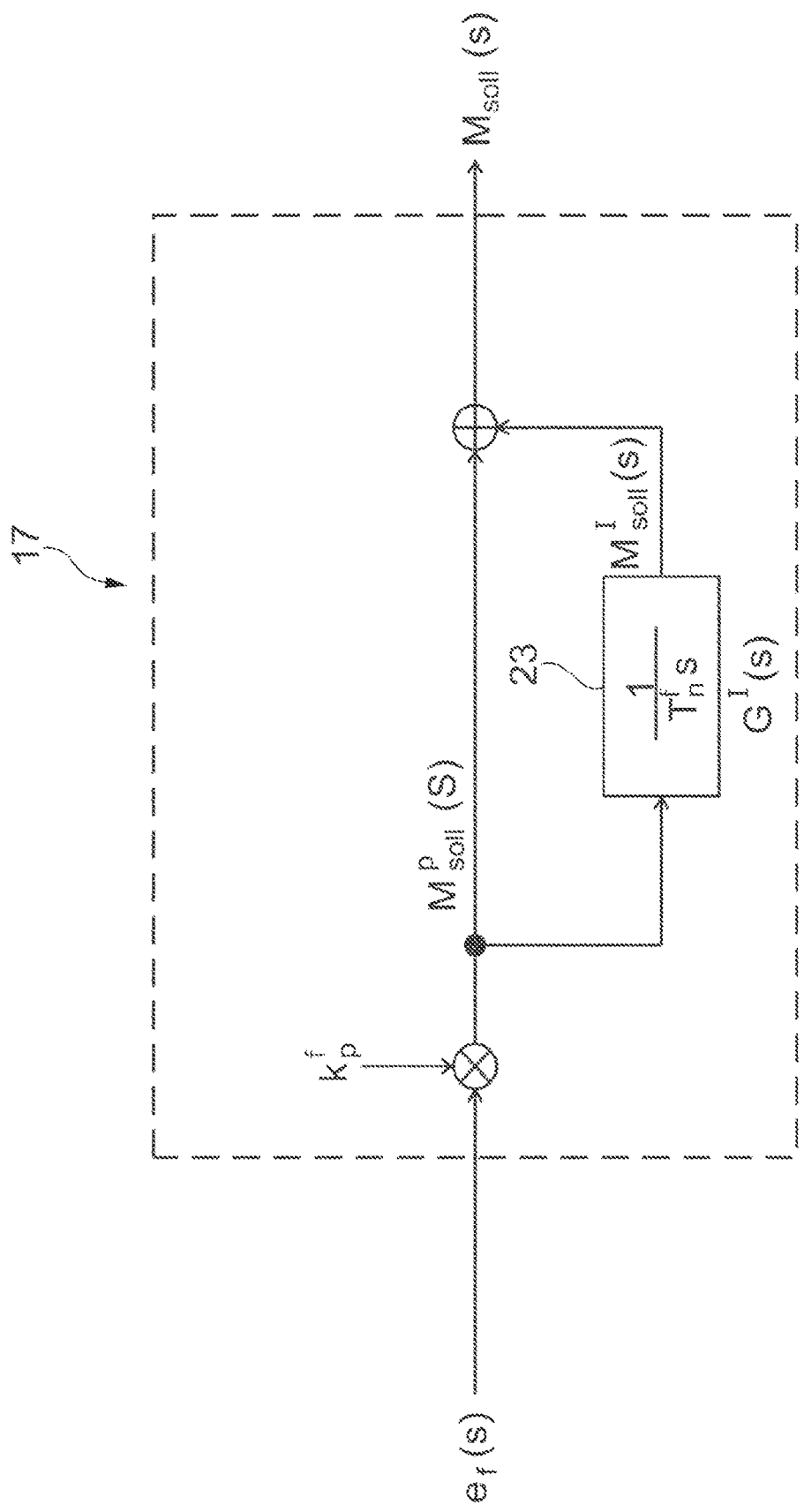
FIG. 4 shows a detailed representation of a frequency controller.

FIG. 4 shows a schematic representation of a detail of the frequency controller 17 according to FIG. 3, which—as described—is optionally implemented as a PI controller. The control deviation $e_f$ is first multiplied here by the proportional coefficient $k_p^f$ so that a proportional component $M_{soll}^P$ is obtained. In an integration element 23, the proportional component $M_{soll}^P$, by division by the product of the reset time $T_n^f$ with the complex variable s, calculates an integral component $M_{soll}^I$, which is then added to the proportional component $M_{soll}^P$. This results in the target torque $M_{soll}$ as output variable. The transfer function G(s) of the frequency controller 17 is therefore given by:

$$G(s) = k_p^f \left(1 + \frac{1}{T_n^f s}\right). \tag{34}$$

The calculation of the proportional coefficient $k_p^f$ is optionally calculated according to equation (3). This is obtained by modeling the controlled system, consisting of the internal combustion engine 5, the shaft 7 and the generator 9, as presented above.

The control rule is adapted here in particular by determining the proportional coefficient $k_p^f$ in such a way that the predetermined loop gain $v^f$ is constant, in particular remains constant.

Figure 5:
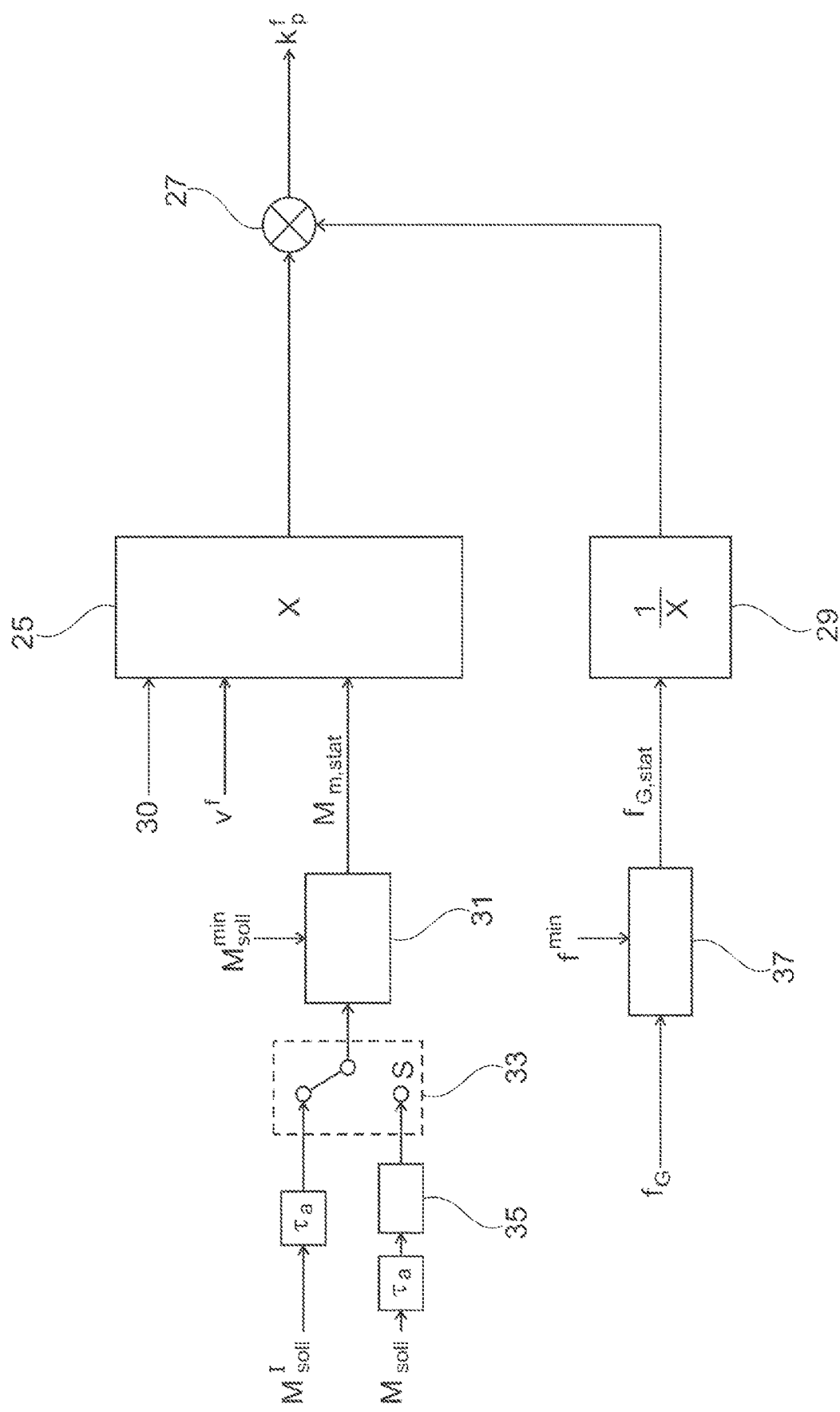
FIG. 5 shows a detailed representation of a first embodiment of a method for calculating the proportional coefficient for the frequency control.

FIG. 5 shows a first option for calculating the proportional coefficient $k_p^f$. The proportional coefficient $k_p^f$ is calculated here strictly according to equation (3) by multiplying the predetermined and in particular predefinable, i.e. optionally parameterizable, loop gain $v^f$ in a first multiplication element 25 by the factor 30 and the torque $M_{m,stat}$ as a target torque variable. The resulting product is multiplied at a first multiplication point 27 by the reciprocal value of the generator frequency $f_{G,stat}$ formed in a first reciprocal value element 29, i.e., the result is divided by the generator frequency $f_{G,stat}$. The torque $M_{m,stat}$ can be determined in two different ways:

According to a first embodiment, it is determined from the integral component $M_{soll}^I$ delayed by one sampling step $\tau_a$, which is then limited downward in a first limiting element 31 to a predetermined torque limit value $M_{soll}^{min}$, for example 100 Nm. In this case, a switch 33 provided for switching between the two calculation types is arranged in the upper switch position according to FIG. 5.

Alternatively, the torque $M_{m,stat}$ in accordance with a second embodiment can be calculated from the target torque $M_{soll}$ calculated by the frequency controller 17. This is also initially delayed by a sampling step $\tau_a$, then filtered by a second filter 35, wherein the second filter 35 is optionally a $PT_1$ filter or a mean value filter, and finally also limited downward to the predetermined torque limit value $M_{soll}^{min}$ in the first limiting element 31. This calculation is active when the switch 33 is in the lower switch position according to FIG. 5.

The generator frequency $f_{G,stat}$ is calculated from the detected generator frequency $f_G$, wherein this is limited downward to a predetermined frequency limit value $f^{min}$ in a second limiting element 37.

Since the generator frequency $f_{G,stat}$ varies only slightly during generator operation, the control rule of the frequency controller 17 can be simplified by assuming that the generator frequency $f_{G,stat}$ is constant, optionally at 50 Hz or 60 Hz, depending on the application. This is advantageous because the calculation of the proportional coefficient $k_p^f$ depends only on the exclusively calculated value of the torque $M_{m,stat}$ and not on a sensor signal. This makes the calculation of the proportional coefficient $k_p^f$ as robust as possible. In particular, this procedure means that the proportional coefficient $k_p^f$ is only determined as a function of the target torque variable, in this case the torque $M_{m,stat}$, wherein the generator frequency is set to be constant for the purpose of determining the proportional coefficient $k_p^f$, in particular is set to a predetermined standard frequency value.

Figure 6:
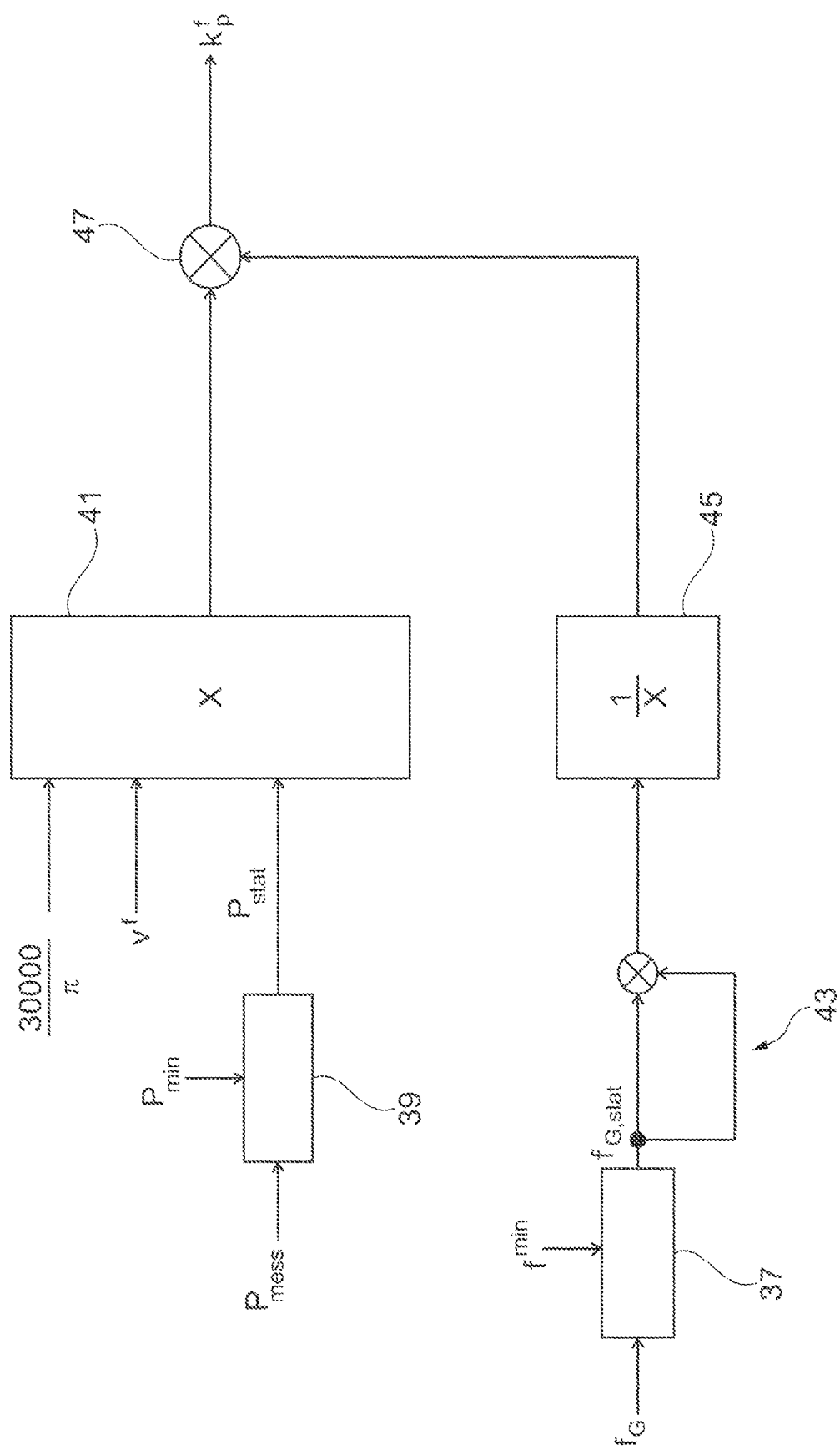
FIG. 6 shows a detailed representation of a second embodiment of a method for calculating the proportional coefficient for the frequency control.

FIG. 6 shows a further embodiment of the calculation of the proportional coefficient $k_p^f$: Here, this is determined as a function of a detected generator power $P_{stat}$, optionally additionally as a function of the detected generator frequency, in particular the generator frequency $f_{G,stat}$.

The detected generator power $P_{stat}$ results here from a measured and optionally filtered power $P_{mess}$ of the generator 9, which is limited downward to a predetermined power limit value $P_{min}$ by a third limiting element 39. The detected generator frequency $f_G$ is in turn limited downward to the predetermined frequency limit value $f^{min}$ by the second limiting element 37.

In a second multiplication element 41, the limited generator power $P_{stat}$ is multiplied by the predetermined loop gain $v^f$ and a factor of 30,000, divided by $\pi$, and the proportional coefficient $k_p^f$ is obtained by dividing the resulting product by the square of the generator frequency $f_{G,stat}$. In particular, the square of the generator frequency $f_{G,stat}$ is first formed in a squaring element 43, then its reciprocal value is formed in a second reciprocal element 45, and this in turn is multiplied at a second multiplication point 47 by the output of the second multiplication element 41.

The proportional coefficient $k_p^f$ is thus calculated in particular according to the following equation:

$$k_p^f = \frac{3 \cdot 10^4 P_{stat} v^f}{\pi f_{G,stat}^2}. \tag{35}$$

Equation (35) can be derived as follows: The following applies for the detected generator power in unitless representation:

$$P_{stat} = \frac{\pi}{3 \cdot 10^4} M_{m,stat} n_{stat}, \tag{36}$$

with the speed $n_{stat}$. Because of $$f_{G,stat} = \frac{n_{stat}}{30} \tag{37}$$

then the following also applies $$P_{stat} = \frac{\pi}{10^3} M_{m,stat} f_{G,stat}, \tag{38}$$

and after reshaping:

$$M_{m,stat} = \frac{10^3 P_{stat}}{\pi f_{G,stat}}. \tag{39}$$

Inserting equation (39) into equation (3) directly gives equation (35).

In another optional embodiment, it is also possible in this case to set the generator frequency $f_{G,stat}$ as constant for the purpose of determining the proportional coefficient $k_p^f$ as constant, which in turn simplifies the calculation and makes it more robust.

Figure 7:
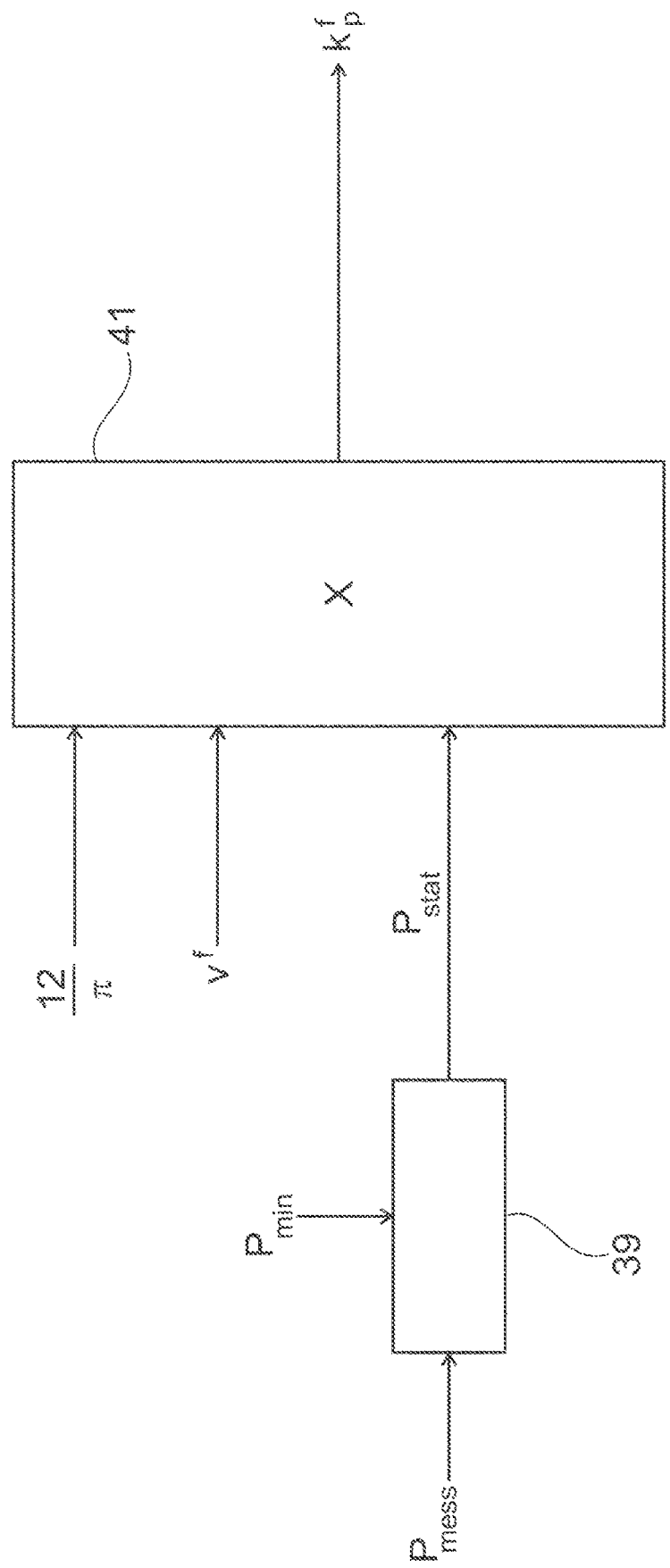
FIG. 7 shows a detailed representation of a third embodiment of a method for calculating the proportional coefficient for the frequency control.

FIG. 7 shows a corresponding variant for 50 Hz, wherein, in contrast to FIG. 6, a factor of $12/\pi$ is used here instead of the factor $30,000/\pi$ and at the same time as a replacement for the lower branch for calculating the generator frequency $f_{G,stat}$.

Figure 8:
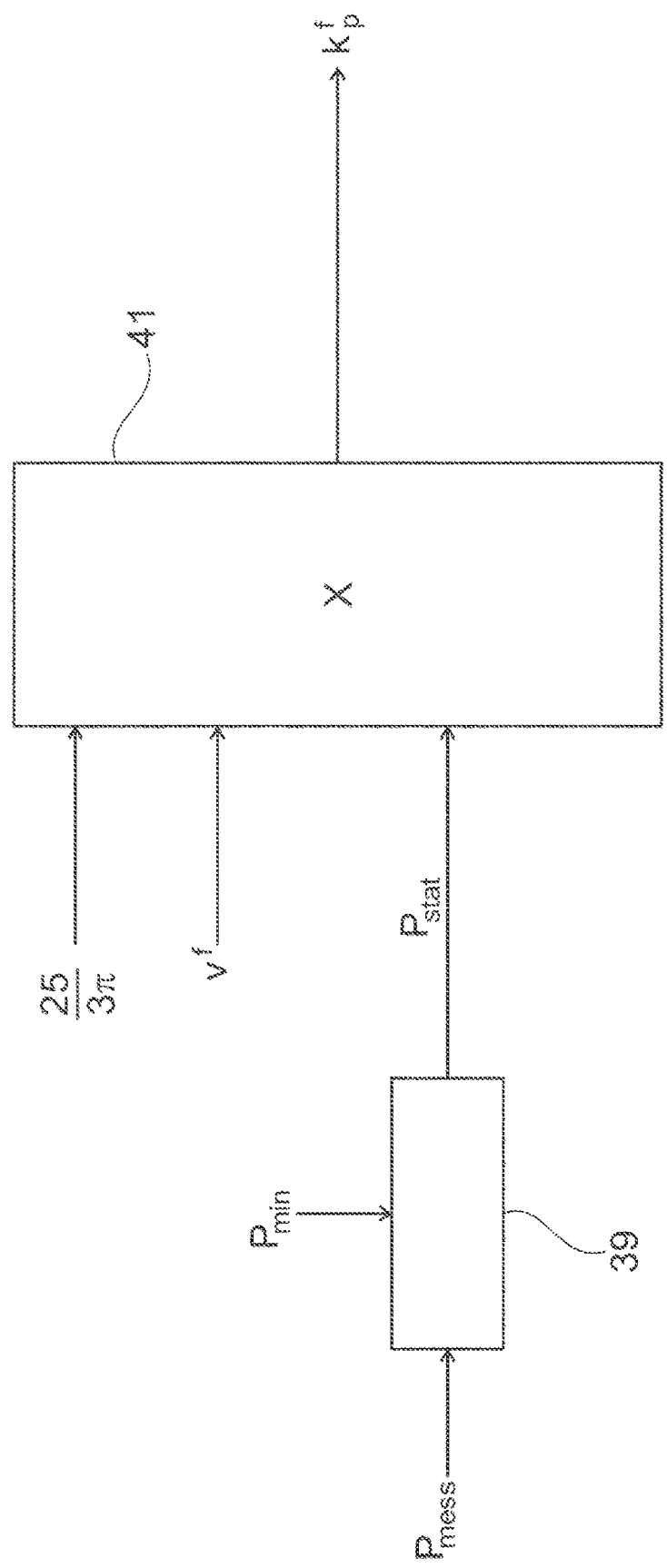
FIG. 8 shows a detailed representation of a fourth embodiment of a method for calculating the proportional coefficient for the frequency control.

FIG. 8 shows a corresponding variant for 60 Hz as a constant value of the generator frequency $f_{G,stat}$. Here, the corresponding factor is $25/(3\pi)$.

In particular, a method for closed-loop control of the power assembly 1 includes the step of detecting the generator frequency $f_G$ of the generator 9 as a controlled variable, furthermore the step of determining the control deviation $e_f$ as the difference between the detected generator frequency $f_G$ and the target generator frequency $f_{soll}$, determining the target torque $M_{soll}$ as a manipulated variable for controlling the internal combustion engine 5 as a function of the control deviation $e_f$, and lastly the step of adapting the control rule used to determine the target torque $M_{soll}$ as a function of at least one adaptation variable, wherein the at least one adaptation variable is selected from a group consisting of the detected generator frequency $f_G$, the target torque variable and the generator power.

Figure 9:
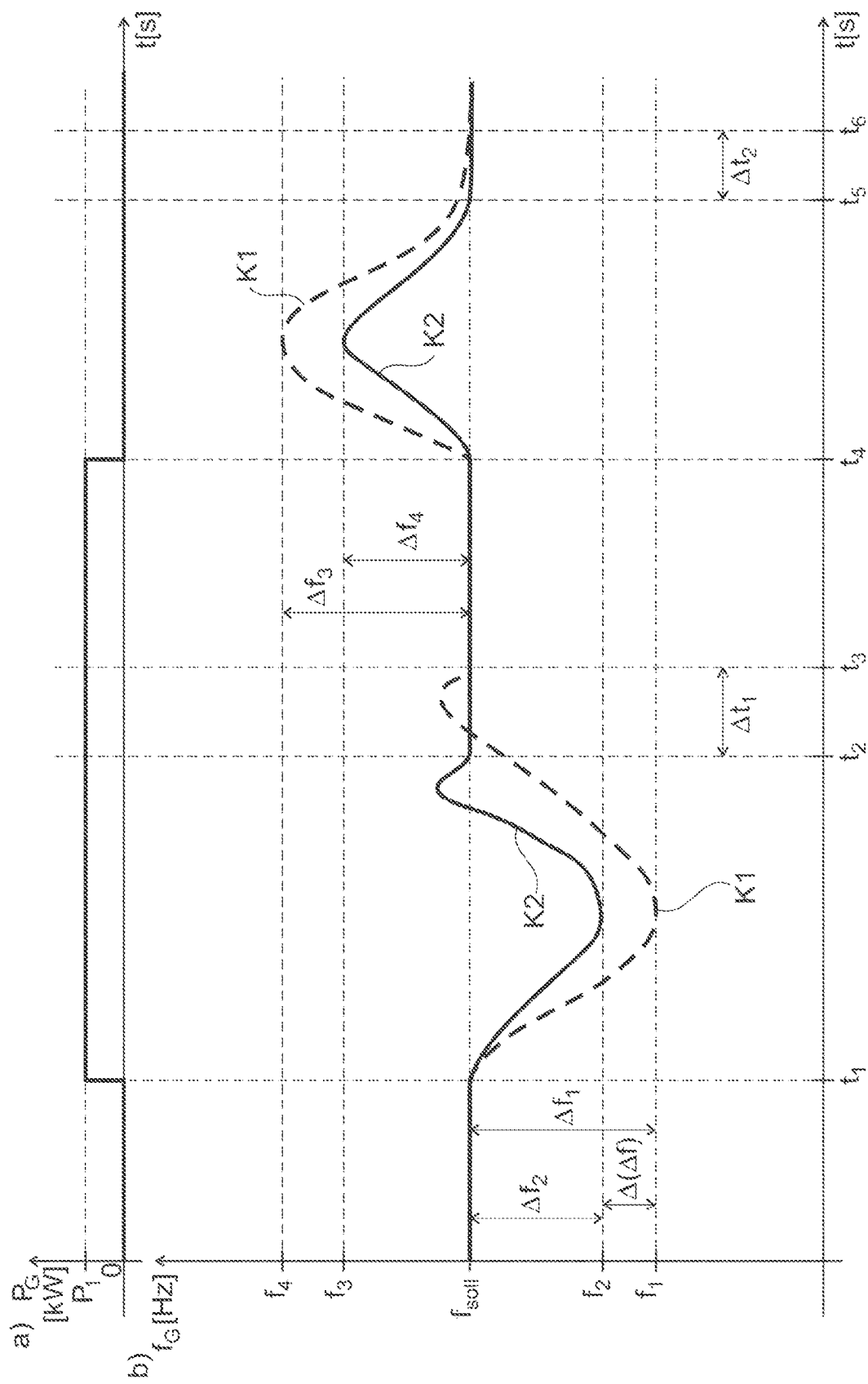
FIG. 9 shows a schematic, diagrammatic representation of the mode of operation of a method for closed-loop control of a power assembly.

FIG. 9 shows a schematic, diagrammatic representation of this method. A first time graph a) shows the time curve of the generator power $P_G$. At a first point in time $t_1$, this changes abruptly from 0 kW to a specific value $P_1$, as a load is switched on at this point in time. At a fourth point in time $t_4$, this load is switched off again, and therefore the generator power $P_G$ again changes abruptly to the value 0 kW.

A second time graph b) shows the course of the detected generator frequency $f_G$ for the case of speed control as a comparative example, represented by a dashed curve K1, and for the case of frequency control according to the present invention or optionally in accordance with the present invention—represented by a solid curve K2.

In the case of speed control, the generator frequency $f_G$, starting at the first point in time $t_1$, drops from the target frequency $f_{soll}$ and falls by a first differential frequency value $\Delta f_1$ to a first frequency value $f_1$. The frequency then rises again and is back to the target generator frequency $f_{soll}$ at a third point in time $t_3$.

In the case of frequency control, the generator frequency $f_G$ drops by a second differential frequency value $\Delta f_2$ to a second frequency value $f_2$ due to the greater dynamics of the frequency control loop. The first differential frequency value $\Delta f_1$ is greater than the second differential frequency value $\Delta f_2$; the first frequency value $f_1$ is less than the second frequency value $f_2$. The generator frequency $f_G$ then rises again and has already settled back to the target generator frequency $f_{soll}$ at a second time $t_2$—before the third point in time $t_3$. Thus, in the case of frequency control according to the second curve K2, the generator frequency $f_G$ has a frequency dip that is smaller by the comparative difference value $\Delta(\Delta f)$, which is the difference between the second frequency value $f_2$ and the first frequency value $f_1$, and a settling time which is shorter by a first time difference value $\Delta t_1$, which is the difference between the third time point $t_3$ and the second time point $t_2$.

At the fourth time $t_4$, the generator load is switched off, as already mentioned above. This causes the detected generator frequency $f_G$ to increase by a third differential frequency value $\Delta f_3$ up to a fourth frequency value $f_4$ in the case of speed control. The frequency then drops and at a sixth point in time $t_6$ has settled back to the target generator frequency $f_{soll}$.

If frequency control is active, the detected generator frequency $f_G$ increases at the fourth point in time $t_4$ and only reaches a third frequency value $f_3$, which is lower than the fourth frequency value $f_4$, before the generator frequency $f_G$ drops again and returns to the target generator frequency $f_{soll}$ at an earlier, fifth time $t_5$.

In the case of load disconnection, the generator frequency $f_G$ therefore increases by a maximum of a third differential frequency value $\Delta f_3$ when speed control is active, but by a maximum of the smaller, fourth differential frequency value $\Delta f_4$ when frequency control is active. In the case of frequency control, the settling time is lower by the second time difference value $\Delta t_2$, which is the difference between the sixth time $t_6$ and the fifth time $t_5$.

It is thus clear that the frequency control according to the present invention or optionally in accordance with the present invention exhibits better load switching behavior than the speed control used by way of comparative example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A closed-loop control device for closed-loop control of a power assembly including an internal combustion engine and a generator having an operative drive connection to the internal combustion engine, the closed-loop control device comprising:
the closed-loop control device which is configured for:
detecting a generator frequency ($f_G$) of the generator as a controlled variable;
determining a control deviation ($e_f$) as a difference between the generator frequency ($f_G$) which is detected and a target generator frequency ($f_{soll}$);
determining a target torque ($M_{soll}$) as a manipulated variable for controlling the internal combustion engine as a function of the control deviation ($e_f$);
using a control rule for determining the target torque ($M_{soll}$); and
adapting the control rule—which is used to determine the target torque ($M_{soll}$)—as a function of at least one adaptation variable, the at least one adaptation variable being selected from a group consisting of the generator frequency ($f_G$) which is detected, a target torque variable, and a generator power,
wherein the closed-loop control device is further configured for an open-loop control device to be operatively connected to the closed-loop control device for directly controlling the internal combustion engine, the closed-loop control device being configured for transferring the target torque ($M_{soll}$) generated as the manipulated variable to the open-loop control device.

2. The closed-loop control device according to claim 1, wherein the closed-loop control device is configured for adapting the control rule by determining a proportional coefficient ($k_p^f$) of the control rule in such a way that a predetermined loop gain ($v^f$) of an open control loop is constant, the predetermined loop gain ($v^f$) being as follows: $v^f = k_p^f (f_{G,stat})/(30 M_{m,stat})$.

3. The closed-loop control device according to claim 2, wherein the closed-loop control device is configured for determining the proportional coefficient ($k_p^f$) as a function of the generator frequency ($f_G$) which is detected and the target torque variable.

4. The closed-loop control device according to claim 2, wherein the closed-loop control device is configured for determining the proportional coefficient ($k_p^f$) only as a function of the target torque variable and for setting the generator frequency ($f_G$) to be constant in order to determine the proportional coefficient ($k_p^f$).

5. The closed-loop control device according to claim 2, wherein the closed-loop control device is configured for determining the proportional coefficient ($k_p^f$) as a function of the generator power—which is detected—of the generator or by setting the generator frequency ($f_G$) to be constant in order to determine the proportional coefficient ($k_p^f$).

6. The closed-loop control device according to claim 2, wherein the closed-loop control device is configured for determining the proportional coefficient ($k_p^f$) as a function of the generator power—which is detected—of the generator, in addition to the generator frequency ($f_G$) which is detected, or by setting the generator frequency ($f_G$) to be constant in order to determine the proportional coefficient ($k_p^f$).

7. The closed-loop control device according to claim 1, wherein the closed-loop control device is configured for filtering an instantaneous actual frequency of the generator and for using the instantaneous actual frequency—which is filtered—as the generator frequency ($f_G$) which is detected.

8. The closed-loop control device according to claim 1, wherein the closed-loop control device is formed as a generator controller.

9. The closed-loop control device according to claim 1, wherein the closed-loop control device is formed as a generator controller with an interface to the open-loop control device of the internal combustion engine.

10. The closed-loop control device according to claim 1, wherein the closed-loop control device does not have or generate any subordinate speed control.

11. The closed-loop control device according to claim 10, wherein the closed-loop control device does not have a speed specification for the internal combustion engine.

12. A closed-loop control arrangement for closed-loop control of a power assembly including an internal combustion engine and a generator having an operative drive connection to the internal combustion engine, the closed-loop control arrangement comprising:
 a closed-loop control device which is formed as a generator controller, is for closed-loop control of the power assembly, and is configured for:
  detecting a generator frequency ($f_G$) of the generator (9) as a controlled variable;
  determining a control deviation ($e_f$) as a difference between the generator frequency ($f_G$) which is detected and a target generator frequency ($f_{soll}$);
  determining a target torque ($M_{soll}$) as a manipulated variable for controlling the internal combustion engine as a function of the control deviation ($e_f$);
  using a control rule for determining the target torque ($M_{soll}$); and
  adapting the control rule—which is used to determine the target torque ($M_{soll}$)—as a function of at least one adaptation variable, the at least one adaptation variable being selected from a group consisting of the generator frequency ($f_G$) which is detected, a target torque variable, and a generator power; and
 an open-loop control device operatively connected to the closed-loop control device for directly controlling the internal combustion engine, the closed-loop control device being configured for transferring the target torque ($M_{soll}$) generated as the manipulated variable to the open-loop control device.

13. The closed-loop control arrangement according to claim 12, wherein the open-loop control device: (a) does not have a speed controller; (b) includes a speed controller which is deactivated; or (c) includes a final idling speed controller which is activated.

14. A power assembly, comprising:
 an internal combustion engine;
 a generator including an operative drive connection to the internal combustion engine; and
 one of:
  (a) a closed-loop control device for closed-loop control of the power assembly, the closed-loop control device being configured for:
   detecting a generator frequency ($f_G$) of the generator as a controlled variable;
   determining a control deviation ($e_f$) as a difference between the generator frequency ($f_G$) which is detected and a target generator frequency ($f_{soll}$);
   determining a target torque ($M_{soll}$) as a manipulated variable for controlling the internal combustion engine as a function of the control deviation ($e_f$);
   using a control rule for determining the target torque ($M_{soll}$); and
   adapting the control rule—which is used to determine the target torque ($M_{soll}$)—as a function of at least one adaptation variable, the at least one adaptation variable being selected from a group consisting of the generator frequency ($f_G$) which is detected, a target torque variable, and a generator power,
   wherein the closed-loop control device is further configured for an open-loop control device to be operatively connected to the closed-loop control device for directly controlling the internal combustion engine, the closed-loop control device being configured for transferring the target torque ($M_{soll}$) generated as the manipulated variable to the open-loop control device; and
  (b) a closed-loop control arrangement for closed-loop control of the power assembly, the closed-loop control arrangement including:
   a closed-loop control device which is formed as a generator controller, is for closed-loop control of the power assembly, and is configured for:
    detecting a generator frequency ($f_G$) of the generator as a controlled variable;
    determining a control deviation ($e_f$) as a difference between the generator frequency ($f_G$) which is detected and a target generator frequency ($f_{soll}$);
    determining a target torque ($M_{soll}$) as a manipulated variable for controlling the internal combustion engine as a function of the control deviation ($e_f$);
    using a control rule for determining the target torque ($M_{soll}$); and
    adapting the control rule—which is used to determine the target torque ($M_{soll}$)—as a function of at least one adaptation variable, the at least one adaptation variable being selected from a group consisting of the generator frequency ($f_G$) which is detected, a target torque variable, and a generator power; and
   an open-loop control device operatively connected to the closed-loop control device for directly controlling the internal combustion engine, the closed-loop control device being configured for transferring the target torque ($M_{soll}$) generated as the manipulated variable to the open-loop control device;

wherein the closed-loop control device or the closed-loop control arrangement is operatively connected to the internal combustion engine and the generator of the power assembly.

15. A method for closed-loop control of a power assembly including an internal combustion engine and a generator having an operative drive connection to the internal combustion engine, the method comprising the steps of:

detecting, by way of a closed-loop control device, a generator frequency ($f_G$) of the generator as a controlled variable;

determining, by way of the closed-loop control device, a control deviation ($e_f$) as a difference between the generator frequency ($f_G$) which is detected and a target generator frequency ($f_{soll}$);

determining, by way of the closed-loop control device, a target torque ($M_{soll}$) as a manipulated variable for controlling the internal combustion engine as a function of the control deviation ($e_f$);

using, by way of the closed-loop control device, a control rule to determine the target torque ($M_{soll}$); and adapting, by way of the closed-loop control device, the control rule—which is used to determine the target torque ($M_{soll}$)—as a function of at least one adaptation variable, the at least one adaptation variable being selected from a group consisting of the generator frequency ($f_G$) which is detected, a target torque variable, and a generator power;

operatively connecting an open-loop control device to the closed-loop control device for directly controlling the internal combustion engine;

transferring, by way of the closed-loop control device, the target torque ($M_{soll}$) generated as the manipulated variable to the open-loop control device.

* * * * *